United States Patent Office 3,826,726
Patented July 30, 1974

3,826,726
PRODUCTION OF PURE METALS
Warren H. Philipp, North Olmsted, Stanley J. Marsik, Fairview Park, and Charles E. May, Rocky River, Ohio, assignors to the United States of America as represented by the Administrator of the National Aeronautics and Space Administration
No Drawing. Continuation-in-part of application Ser. No. 876,588, Nov. 13, 1969, now Patent No. 3,658,569. This application Apr. 18, 1972, Ser. No. 245,279
Int. Cl. B01j 1/10
U.S. Cl. 204—157.1 H                      10 Claims

ABSTRACT OF THE DISCLOSURE

A process for depositing elements by irradiating liquids. Ultra pure elements are precipitated from aqueous solutions or suspensions of compounds. A solution of a salt of a metal to be prepared is irradiated, and the insoluble reaction product settles out. Some chemical compounds may also be prepared in this manner.

ORIGIN OF THE INVENTION

The invention described herein was made by employees of the United States Government and may be manufactured and used by or for the Government for governmental purposes without the payment of any royalties thereon or therefor.

RELATED APPLICATION

This application is a continuation-in-part of copending application Ser. No. 876,588, filed Nov. 13, 1969, now U.S. Pat. No. 3,658,569.

BACKGROUND OF THE INVENTION

This invention is concerned with a radiation-chemical process for depositing high purity elements, particularly metals. The invention is also directed to the separation of desired metals from solutions containing several metal compounds.

At the present time there are numerous methods of producing metals. Some of these methods utilize high temperatures. These methods include the direct reduction of a metal compound with carbon or hydrogen, aluminothermic reactions, and the electrolysis of fused salt systems.

Problems of contamination of the metal product have been encountered with these high temperature methods. This contamination is the result of the solubility of the container material in the reaction media and/or its diffusion into the media. Contamination can also be caused by reactants, such as carbon or other metals, as well as oxygen or nitrogen which are components of the atmosphere because of the strong tendency of metals to oxidize at elevated temperatures.

Not only are problems encountered in controlling the conventional chemical processes to avoid chemical contamination, but also isolation of the metal is difficult to achieve. One disadvantage of the conventional electrochemical process is that it is limited to electrically conducting solvents.

SUMMARY OF THE INVENTION

These problems have been solved by the present invention wherein solutions of metal salts or compounds are irradiated with high energy particles. This promotes a chemical reaction causing metals to precipitate, or separate out, from the solutions. The process is performed at room temperature, normal pressure, and under an inert atmosphere.

Copending application Ser. No. 876,588, filed Nov. 13, 1969, now U.S. Pat. No. 3,658,569, describes a radiation-chemical process for depositing nickel. A substrate is impregnated with an irradiation sensitive salt and then irradiated to cause a chemical change. Nickel is deposited by immersing the substrate in an aqueous developing solution.

The reaction mechanism of the present invention involves a decomposition of the solvent by ionizing radiation. In aqueous systems the species formed are hydrogen atoms, hydrated (solvated) electrons, and hydroxyl radicals. The hydrogen atoms and hydrated (solvated) electrons are reducing agents while the hydroxyl radicals are oxidizing agents. A metal can be reduced by the hydrogen atoms or hydrated (solvated) electrons.

OBJECTS OF THE INVENTION

It is, therefore, an object of the present invention to provide a radiation chemistry method for producing the elements and compounds of high purity as well as improved polymers and new compounds.

Another object of the invention is to provide a low temperature process for preparing pure metals from a solution; the temperature being limited by the freezing point of the solution.

Still another object of the invention is to provide a radiochemical method of producing pure metals in an oxygen and nitrogen-free media.

A further object of the invention is to provide a method of producing adherent metal coatings on substrates as well as the controlled deposition of materials.

A still further object of the invention is to provide a method for separating individual metals from solutions containing two or more metal compounds.

An additional object of the invention is to provide an improved method of preparing catalysts.

These and other objects and advantages of the invention will be apparent from the specification which follows.

DESCRIPTION OF THE PREFERRED EMBODIMENT

According to the preferred embodiment of the invention aqueous solutions or suspensions of metal compounds are irradiated with high energy particles. Such particles include electrons, protons, ions and neutrons obtained from particle accelerators and radioactive sources.

The present invention is based on the existence of relatively long lived reducing species produced when certain liquids are irradiated. In water every 100 electron volts of radiation energy produces about four hydrated (solvated) electrons. Therefore, a single 1 mev. electron from an irradiation source produces about $10^4$ hydrated (solvated) electrons.

The addition of a hydroxyl radical scavenger which reacts rapidly with the oxidizing hydroxyl radicals (OH) but slowly with the reducing hydrogen atoms (H) and hydrated (solvated) electrons ($e_{aq}^-$) generates an overall reducing system. These hydroxyl radical scavengers include primary alcohols, secondary alcohols, polyhydroxyl alcohols, aldehydes and, in general, readily oxidizable organic compounds. Some inorganic reducing agents, such as hypophosphites, $H_2PO_2^-$, may also be used. For many organic solvents a scavenger additive is unnecessary.

According to the invention the metal compound is dissolved in an appropriate solvent or mixture of solvents. To illustrate the preferred embodiment of the invention about 500 cubic centimeters of an aqueous solution containing a metal salt and a scavenger was placed in a reaction vessel which was closed to the atmosphere. Irradiation with high energy particles in the form of an electron beam furnished by a Dynamitron accelerator was satisfactory. This accelerator is capable of supplying accelerating potentials between 0.5 and 3.0 million volts together with a controllable beam current capability up to 10 milliamperes.

The electron beam entered the vessel through a thin metal window, such as .001 inch thick titanium foil. A nonoxidizing or inert gas passing through fritted glass at the bottom of the vessel provided stirring of the solution. The gas exited through an outlet tube near the top of the vessel.

The contents were maintained at about 20° C. during irradiation by immersing the reaction vessel in a water bath. The duration of the average run was between one and two hours. The dose, in coulombs, was obtained from a beam current integrator.

The product yield, $n \cdot G(M)$, is essentially independent of electron accelerating voltage between 0.5 and 2.5 mev. An accelerating voltage of 2 mev. was used for all the runs. The penetration of the electrons was about one centimeter, and the diameter of the beam was about four centimeters.

After irradiation, the insoluble product deposited from the aqueous solution was removed by centrifuging and washed thoroughly with water. The wet powder was then suspended in acetone, filtered in a fritted glass filter, and dried at room temperature for about 12 hours. The tared filter containing the metal powder was further dried at about 70° C. for about 2 hours and weighed. A relatively low drying temperature was used to prevent undue atmospheric oxidation of the metal powder. Metal samples used for analysis were vacuum dried at 100° C. instead of being dried in air.

Twelve metals were prepared in this manner by electron irradiation of their aqueous salt solution. These metals are listed in Table I.

TABLE I.—YIELDS OF 12 METALS

| Metal | $n \cdot G(M)$ | Yield, grams per kilowatt hour |
|---|---|---|
| Copper | 4.4 | 52 |
| Silver | 3.6 | 145 |
| Zinc | .28 | 3.4 |
| Cadmium | 1.8 | 38 |
| Thallium | .79 | 60 |
| Tin | .20 | 4.4 |
| Lead | 3.2 | 124 |
| Antimony | 2.7 | 41 |
| Iron | .001 | .01 |
| Nickel | 1.7 | 19 |
| Cobalt | .6 | 6.6 |
| Palladium | 4.7 | 93 |

The yields in Table I for thallium, tin, antimony, iron, nickel and cobalt were from products prepared from alkaline solutions. Each yield in Table I is first expressed in terms of $n \cdot G(M)$ where $n$ is the valence change that occurs when the metal ion is reduced to the metal, and $G(M)$ is the number of metal atoms produced for 100 ev. energy. The yield is also expressed in grams per kilowatt-hour. For a valence change of two, an $n \cdot G(M)$ value of 1 is equivalent to about 0.2 mole of metal product per kilowatt-hour of energy into the solution.

In most cases metal produced radiochemically from the aqueous solution deposited as fine powders. The metal powders, especially the more active metals, are sensitive to atmospheric oxidation. The soft metals, cadmium, tin, and particularly lead form macro sponge-like conglomerates. When formed by irradiating a solution of an electrolyte, such as lead acetate, some of the lead is colloidal. In such a solution a lead mirror deposits on the glass reaction vessel. No colloidal lead is formed from a solution of a strong electrolyte, such as lead perchlorate or a base solution containing lead acetate.

Inherent characteristics of the radio-chemical method lead to the production of high purity metals. Deposition of metals occurs at a low enough temperature where contamination due to diffusion of container material and/or reaction with the environment is minimized. The product is isolated as a precipitate; reactants and unwanted reaction products remain in solution. Also easily purified metal salts may be used.

Samples of silver, copper and nickel were all found to be 99.9+% pure by chemical analysis. In each metal, X-ray defraction showed that only the metal was present.

DESCRIPTION OF ALTERNATE EMBODIMENT

Active metals, those which reduce water, and anhydrous compounds are best prepared from dry organic liquids. Antimony and some anhydrous lower valence metal halides were prepared in accordance with the invention using dry organic liquids as solvents. Antimony (III) chloride ($SbCl_3$) was selected as the metal salt because of its solubility in a wide variety of organic liquids and because of the relative convenience in handling antimony metal.

The yield of antimony upon irradiation of $SbCl_3$ solutions in dry organic liquids is shown in Table II. As in the preferred embodiment the electron energy was 2 mev. The concentration of the $SbCl_3$ was 0.25 M, the current was 20 µa., and the dose was 0.20 coulomb.

TABLE II.—ANTIMONY YIELD

| Organic liquid | $n \cdot G(Sb)$ | Purity of Sb, percent |
|---|---|---|
| Methanol | 2.4 | 99.9+ |
| 1-butanol | 1.9 | 99.9+ |
| Tetrahydrofuran | 1.9 | 98.6 |
| 2-propanol | 1.6 | 99.0 |
| Amyl acetate | .73 | 94.6 |
| Quinoline | .40 | |
| Dibutyl phthalate | .35 | |
| 2-methyl-2-propanol | .32 | |
| Oleic acid | .30 | |
| Toluene | .25 | ca. 85 |
| Ethylbenzene | .25 | ca. 90 |
| Acetic acid | .20 | |
| 3-heptanone | 0 | |
| Glycerol | 0 | |

While several embodiments of the invention have been described it will be appreciated that various modifications may be made without departing from the spirit of the invention or the scope of the subjoined claims. For example, other metals including zinc and cadmium have also been deposited from dry organic liquids.

What is claimed is:

1. A radiation chemical process for producing pure metals comprising the steps of
    adding an oxidizing species scavenger to a liquid which decomposes when irradiated with high energy particles producing long lived reducing species and oxidizing species,
    dissolving at least one metal compound in said liquid to form a solution,
    placing said solution in an inert atmosphere at ambient temperature and pressure,
    irradiating said solution with high energy particles while in said inert atmosphere at ambient temperature and pressure thereby decomposing said liquid whereby said oxidizing species are scavenged and at least one metal is reduced and precipitates from said solution as a pure metal, and
    removing said pure metal from said solution.

2. A radiation chemical process as claimed in claim 1 wherein a salt of a metal is dissolved in the solvent and said metal precipitates from said solvent.

3. A radiation chemical process as claimed in claim 1 wherein a plurality of metal compounds are dissolved in the solvent and a predetermined metal precipitates from said solvent.

4. A radiation chemical process as claimed in claim 1 wherein the solution is irradiated with an electron beam having an accelerating voltage between 0.5 and 2.5 mev.

5. A radiation chemical process as claimed in claim 4 wherein the solution is irradiated with an electron beam having an accelerating voltage of about 2 mev.

6. A radiation chemical process as claimed in claim 1 wherein the solvent is a dry organic liquid.

7. A radiation chemical process as claimed in claim 6 wherein antimony (III) chloride is dissolved in the dry organic liquid and antimony precipitates from the solution during irradiation.

8. A radiation chemical process as claimed in claim 1 wherein the solvent is water which forms hydrogen atoms, hydrated atoms, and hydroxyl radicals during irradiation.

9. A radiation chemical process as claimed in claim 8 wherein the solvent contains a hydroxyl radical scavenger.

10. A radiation chemical process as claimed in claim 9 wherein the solvent contains hydroxyl radical scavengers selected from the group consisting of primary alcohols, secondary alcohols, polyhydroxyl alcohols, and aldehydes.

References Cited

UNITED STATES PATENTS

| | | | |
|---|---|---|---|
| 3,073,766 | 1/1963 | Bown et al. | 204—157.1 H |
| 3,104,216 | 9/1963 | Ruskin | 204—157.1 H |

HOWARD S. WILLIAMS, Primary Examiner